June 24, 1930.  F. G. FOLBERTH ET AL  1,765,410
SUPPORT
Filed Jan. 9, 1925
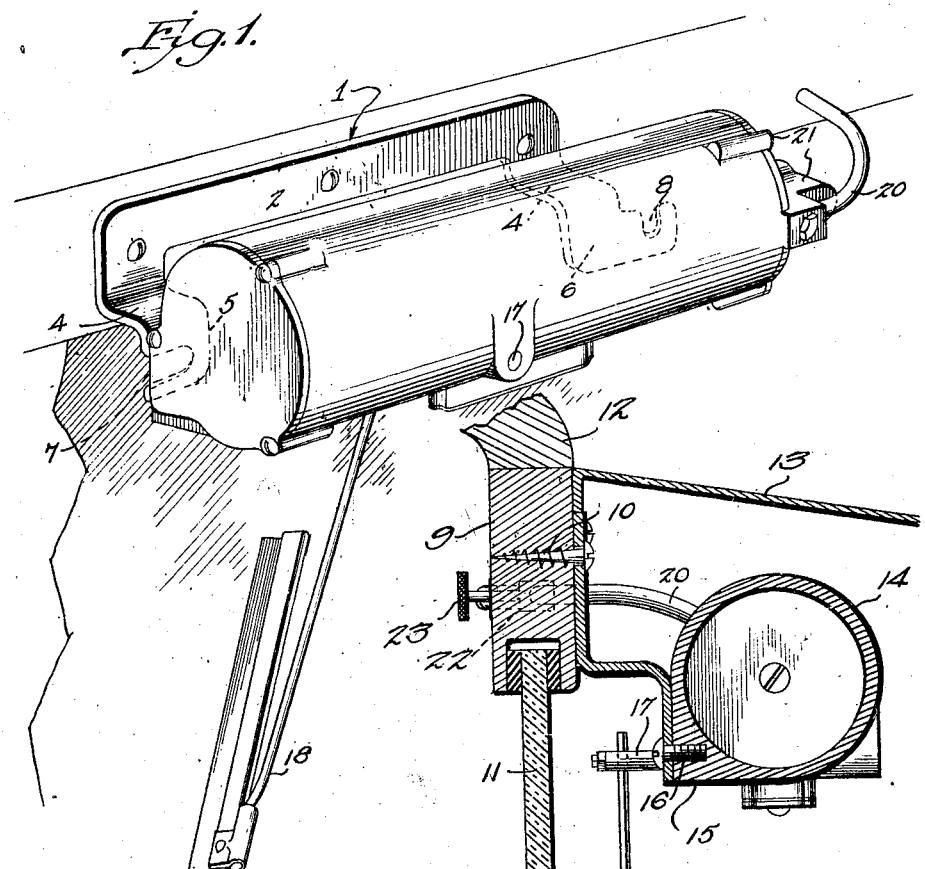
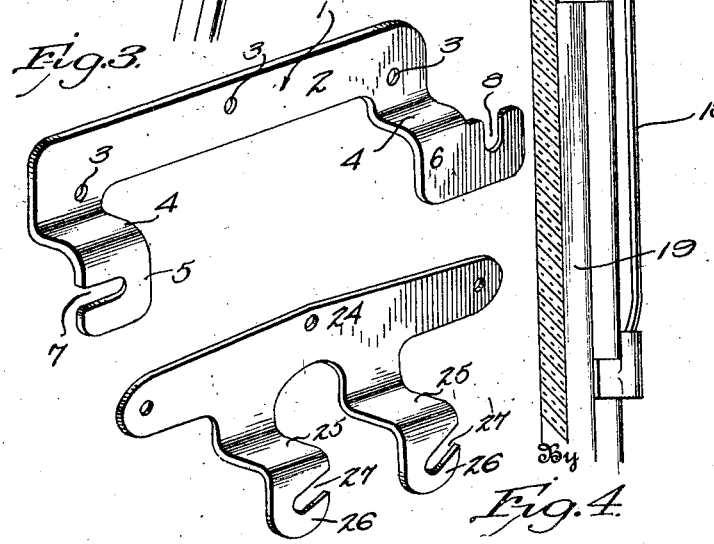
Inventor
F. G. FOLBERTH
W. M. FOLBERTH Patented June 24, 1930

1,765,410

UNITED STATES PATENT OFFICE

FREDERICK G. FOLBERTH AND WILLIAM M. FOLBERTH, OF CLEVELAND, OHIO, ASSIGNORS TO TRICO PRODUCTS CORPORATION, OF BUFFALO, NEW YORK, A CORPORATION OF NEW YORK

SUPPORT

Application filed January 9, 1925. Serial No. 1,454.

This invention relates to supports, and more particularly to a device for supporting a windshield cleaner motor on the windshield of a motor vehicle.

In windshield cleaners operated by the suction of the intake manifold of an internal combustion engine, the motor is generally arranged on the interior of the windshield frame in the manner shown in the Reissue Patent No. 15,502, granted to William M. Folberth, on December 5, 1922.

In mounting the motor, on the windshield frame, it is necessary to drill a number of holes in the frame to receive the bolts which retain the motor in position and to permit the passage of the shaft from the interior of the vehicle to the exterior where the cleaner arm is arranged. These holes must be of predetermined size and must be properly spaced in order that the openings in the motor for the reception of the bolts will aline with the openings in the frame and in order that the shaft will be properly received in the opening in the frame.

In certain types of closed cars now being made, a wooden frame is employed for the windshield and a visor is arranged above the windshield frame. In a construction of this character, it is feasible to place the cleaner motor on the outside of the vehicle as it is protected from the elements by the visor.

An object of the present invention is the provision of a readily detachable bracket to support the motor in a novel manner without hindering the operation of the wiper actuating parts.

A further object of the invention resides in the mounting of the motor in a position slightly spaced from the windshield frame to be housed beneath the visor and conveniently controlled from within the automobile.

A further object of the invention is the provision of a bracket having slots properly arranged to aline with the bolt receiving openings in the cleaner motor to facilitate the assembly of the bracket and motor.

In the accompanying drawings, we have shown several embodiments of the invention. In this showing:

Figure 1 is a perspective view of a portion of a windshield frame looking from the exterior and showing a bracket and motor casing in position, Figure 2 is a vertical sectional view, Figure 3 is a perspective view of one form of bracket, and, Figure 4 is a similar view of another form of bracket.

Referring to Figure 3 of the drawings, the reference numeral 1 designates generally a bracket consisting of a main body portion 2 which is arranged on the exterior of the windshield frame and which may be provided with any number of openings 3 for the reception of suitable fastening elements. Adjacent each end, the main portion of the bracket is provided with an extension 4 which, as shown, is offset. At the outer ends of each of these extensions, there is provided arms 5 and 6 and these arms are arranged in a plane parallel to the plane of the main portion 2. The arm 5 is provided with a laterally extending slot 7 opening toward the outside of the bracket. The arm 6 is extended beyond the end of the bracket and is provided with a vertical, upwardly opening slot 8.

When the bracket is arranged to support a windshield cleaner motor in proximity to a windshield, it is fastened to a windshield frame 9 by means of suitable screws 10. As shown, the bracket is arranged on the top of the frame above the windshield 11 and beneath the top 12 of the vehicle. The windshield is equipped with a visor or sun shade 13, as shown in Figure 2 of the drawings. With the bracket arranged on the exterior of the frame, the arms 5 and 6 will be slightly spaced from the front of the windshield, as shown. A motor casing 14 is adapted to be supported by the bracket and arranged immediately below the visor to protect it from the elements. As shown, this motor casing is provided with a boss 15 adjacent each end which boss is provided with a threaded opening for the reception of a bolt 16. In assembling the motor casing and bracket, one of the bolts is first placed in the slot 7 and moved to the inner end of the slot before being tightened. The other bolt is then dropped into the slot 8 and tightened. The windshield cleaner motor is provided with a shaft 17 and in the present assembly, the shaft is arranged at the bottom of the motor casing, as shown. This shaft projects from the motor casing toward the windshield and is adapted to receive a cleaner arm 18 which carries a cleaner element 19.

As the motor is arranged externally of the vehicle, the usual control valve arranged on the motor casing is eliminated and a flexible hose 20 is connected to the suction head 21 of the cleaner motor and extended to a valve 22 arranged within the windshield frame and indicated in dotted lines in Figure 2 of the drawings. As the valve may be of any conventional construction, a detail showing thereof is omitted. The valve is provided with an operating handle 23, projecting into the interior of the vehicle.

In Figure 4 of the drawings, we have shown a slightly modified form of bracket for use in connection with windshield cleaner motors having the openings for the reception of the supporting bolts arranged closer to each other. In this form of the invention, we provide a bracket consisting of a main body portion 24 having a pair of offset portions 25 arranged adjacent the center and these offset portions are provided with depending arms 26 arranged in a plane parallel to the main portion of the bracket. The arms 26 are provided with inclined slots 27.

The operation of the device will be apparent from the foregoing description. Among the many advantages to be gained by the use of the bracket is the fact that the slots 7 and 8 are properly spaced for the reception of the bolts 16 and that the bracket may be immediately assembled by merely tightening the bolts 16 to engage the bracket. The bracket may then be mounted on the windshield frame without any previous spacing of the openings which receive the screws 10. This eliminates the precision necessary in drilling holes through the frame for the reception of the supporting bolts and the motor shaft.

It is to be understood that the forms of our invention herewith shown and described are to be taken as preferred examples of the same, and that various changes in the shape, size, and arrangement of parts may be resorted to without departing from the spirit of the invention or the scope of the subjoined claim.

We claim:

A support for holding a windshield cleaner motor spaced forwardly from a windshield to permit its wiper actuating shaft to operate between the windshield glass and the motor, comprising a one-piece member stamped from sheet metal and adapted to be secured to a windshield frame, said member being provided with integral but spaced terminal offsets between which the wiper actuating part of the motor may operate, and an arm integral with and extending substantially at right angles from each of said offsets for supporting the motor, said arms being offset from the body portion of said member and provided with openings for the reception of fastening elements arranged in said motor, and being disposed in a plane forwardly of and substantially parallel to said member.

In testimony whereof, we affix our signatures.

FREDERICK G. FOLBERTH.
WILLIAM M. FOLBERTH.